(12) United States Patent
Choy

(10) Patent No.: US 10,314,431 B2
(45) Date of Patent: Jun. 11, 2019

(54) INFUSION COOKING ASSEMBLY

(71) Applicant: Shawn Choy, Oakland, CA (US)

(72) Inventor: Shawn Choy, Oakland, CA (US)

( * ) Notice: Subject to any disclaimer, the term of this patent is extended or adjusted under 35 U.S.C. 154(b) by 278 days.

(21) Appl. No.: 15/335,602

(22) Filed: Oct. 27, 2016

(65) Prior Publication Data

US 2018/0116451 A1 May 3, 2018

(51) Int. Cl.
*A47J 36/38* (2006.01)
*A47J 27/00* (2006.01)
*A47J 36/06* (2006.01)
*A47J 36/20* (2006.01)

(52) U.S. Cl.
CPC ............ *A47J 36/38* (2013.01); *A47J 27/002* (2013.01); *A47J 36/06* (2013.01); *A47J 36/20* (2013.01)

(58) Field of Classification Search
CPC  A47J 36/38; A47J 36/20; A47J 27/002; A47J 36/06; A47J 2027/046
USPC .. 99/345, 426, 532, 352, 332, 483, 421 HH, 99/421 HV, 421 R, 421 H
See application file for complete search history.

(56) References Cited

U.S. PATENT DOCUMENTS

| | | | | |
|---|---|---|---|---|
| 849,290 A | * | 4/1907 | Vanderbilt | A47J 37/0694 126/332 |
| 1,339,625 A | * | 5/1920 | Holloway | A47J 37/106 99/346 |
| 3,392,665 A | * | 7/1968 | Harnest | A47J 37/0694 211/181.1 |
| D217,789 S | * | 6/1970 | Oddo | D19/85 |
| 4,027,583 A | * | 6/1977 | Spanek | A47J 43/18 126/30 |
| 4,407,189 A | * | 10/1983 | Bentson | A47J 37/0694 211/198 |
| 4,421,017 A | * | 12/1983 | Ross | A47J 37/049 99/421 H |
| 4,450,759 A | * | 5/1984 | Steibel | A47J 37/0694 211/189 |
| 4,557,188 A | * | 12/1985 | Spanek | A47J 43/18 211/181.1 |
| 4,558,197 A | * | 12/1985 | Wyatt | H05B 6/6408 219/732 |
| 4,633,773 A | * | 1/1987 | Jay | A47J 43/18 211/181.1 |
| 4,709,626 A | * | 12/1987 | Hamlyn | A47J 43/18 99/345 |
| 4,924,768 A | * | 5/1990 | Jay | A47J 37/0694 211/125 |
| D316,007 S | * | 4/1991 | Wagner | D7/366 |

(Continued)

*Primary Examiner* — Jimmy Chou

(57) ABSTRACT

An infusion cooking assembly for infusing flavor into items during cooking includes a housing that has a top, which is open. A set of holes is positioned through a bottom of the housing. A set of cups is positionable in an internal space of the housing. Each of set of rods is coupled to and extends bidirectionally from a lower surface of a respective cup. The rods are complementary to the holes. A lid is reversibly couplable to the housing to cover the top. A tube is coupled to the lid and is fluidically coupled to interior spaces of the cups. The tube is configured for placement of an item to be cooked and flavored, such as a chicken. The cups are configured to insert flavoring items into the interior spaces. The flavoring items are heated and infused into the item to be cooked as the item is cooked.

15 Claims, 4 Drawing Sheets

(56) References Cited

U.S. PATENT DOCUMENTS

| | | | | |
|---|---|---|---|---|
| 5,025,715 A * | 6/1991 | Sir | A47J 33/00 126/30 |
| 5,069,117 A * | 12/1991 | Schlessel | A47J 43/18 99/419 |
| 5,081,916 A * | 1/1992 | Kuhling | A47J 37/00 99/345 |
| 5,106,642 A * | 4/1992 | Ciofalo | A23L 13/50 211/85.4 |
| 5,301,602 A * | 4/1994 | Ryczek | A47J 43/18 99/345 |
| 5,442,999 A * | 8/1995 | Meister | A47F 3/001 99/419 |
| 5,575,198 A * | 11/1996 | Lowery | A47J 43/18 99/426 |
| 5,638,742 A * | 6/1997 | Kassaseya | A47J 43/18 211/181.1 |
| 5,662,028 A * | 9/1997 | Fraga | A47J 37/049 99/419 |
| 5,730,046 A * | 3/1998 | Battaglia | A47J 43/18 426/523 |
| 5,791,235 A * | 8/1998 | Anselmo | A47J 43/18 211/181.1 |
| 5,842,409 A * | 12/1998 | Loffler | A47J 43/18 99/421 V |
| 5,893,320 A * | 4/1999 | Demaree | A47J 43/18 219/725 |
| 5,913,965 A * | 6/1999 | Gargano | A47J 37/106 99/346 |
| D412,297 S * | 7/1999 | Roach | D11/152 |
| 5,981,926 A * | 11/1999 | Kim | A47J 43/18 219/732 |
| 6,039,373 A * | 3/2000 | Horn | A47J 43/18 294/15 |
| 6,062,131 A * | 5/2000 | Holland | A47J 43/18 99/345 |
| 6,119,585 A * | 9/2000 | Guidry | A47J 43/18 99/345 |
| 6,192,792 B1 * | 2/2001 | Gremillion | A47J 43/18 99/347 |
| 6,216,586 B1 * | 4/2001 | Burgin | A47J 43/18 99/339 |
| 6,265,004 B1 * | 7/2001 | Cagle | A22B 5/0094 426/129 |
| 6,272,976 B1 * | 8/2001 | Berryman | A47J 27/04 99/340 |
| 6,314,869 B1 * | 11/2001 | Bourgeois, Jr. | A47J 33/00 99/340 |
| D453,488 S * | 2/2002 | McCauley | D11/152 |
| 6,349,632 B1 * | 2/2002 | Beck, Jr. | A47J 37/049 99/345 |
| D461,682 S * | 8/2002 | Fandrey | D7/323 |
| 6,427,582 B1 * | 8/2002 | Measom | A47J 27/00 99/342 |
| 6,460,452 B1 * | 10/2002 | Hester | A47J 37/049 99/347 |
| 6,467,399 B1 * | 10/2002 | Boutte | A47J 43/18 99/347 |
| 6,487,964 B2 * | 12/2002 | Snoke | A47J 37/01 99/345 |
| 6,502,501 B1 * | 1/2003 | Simon | A47J 27/04 99/345 |
| 6,502,503 B1 * | 1/2003 | Bell, Jr. | A47J 36/16 99/345 |
| 6,503,551 B1 * | 1/2003 | Hester | A47J 37/049 426/523 |
| 6,553,896 B1 * | 4/2003 | Heide | A47J 43/18 99/347 |
| D488,741 S * | 4/2004 | Moya | D11/143 |
| D505,827 S * | 6/2005 | Riddle, III | D7/360 |
| D506,352 S * | 6/2005 | Dow | D7/361 |
| 6,945,161 B1 * | 9/2005 | Battaglia | A47J 37/0694 211/181.1 |
| D513,930 S * | 1/2006 | Novi | D7/409 |
| 7,040,219 B1 * | 5/2006 | D'Amato | A47J 43/18 211/181.1 |
| D522,807 S * | 6/2006 | Dow | D7/361 |
| 7,144,596 B2 | 12/2006 | Snoke et al. | |
| D547,603 S * | 7/2007 | Passman | D7/355 |
| D557,071 S * | 12/2007 | Zemel | D7/323 |
| D558,519 S * | 1/2008 | Zemel | D7/409 |
| D560,967 S * | 2/2008 | Zemel | D7/409 |
| D564,286 S * | 3/2008 | Zemel | D7/354 |
| D573,838 S * | 7/2008 | Jones | D7/409 |
| D591,105 S * | 4/2009 | Hodges | D7/409 |
| 7,549,369 B2 * | 6/2009 | Zimmerman | A47J 37/06 222/146.5 |
| 7,565,863 B2 * | 7/2009 | Tschetter | A47J 37/0694 99/419 |
| 7,879,381 B2 * | 2/2011 | Dow | A47J 36/00 426/523 |
| 7,946,221 B2 * | 5/2011 | Hull, Jr. | A47J 37/106 99/346 |
| D639,186 S * | 6/2011 | Shapiro | D9/711 |
| D639,601 S * | 6/2011 | Borovicka | D7/354 |
| D639,656 S * | 6/2011 | Shapiro | D9/435 |
| 8,110,237 B2 * | 2/2012 | Smith | A47J 43/18 426/241 |
| D657,612 S * | 4/2012 | Cloutier | D7/354 |
| D671,355 S * | 11/2012 | Zmrhal | D7/354 |
| 8,397,630 B2 * | 3/2013 | Oswald | A47J 27/04 99/346 |
| D689,245 S * | 9/2013 | Rowe | D30/132 |
| 8,539,877 B2 * | 9/2013 | Levy | A23L 5/13 426/509 |
| D694,477 S * | 11/2013 | Rowe | D30/132 |
| D700,004 S * | 2/2014 | Weskamp | D7/354 |
| 8,813,636 B2 * | 8/2014 | Oswald | A47J 27/04 99/345 |
| D727,678 S * | 4/2015 | Minor | D7/354 |
| D737,103 S * | 8/2015 | Cloutier | D7/554.2 |
| 9,155,423 B2 * | 10/2015 | Malone | A47J 43/18 |
| D818,760 S * | 5/2018 | Abbo | D7/354 |
| 10,015,975 B2 * | 7/2018 | Parrish | A23B 4/052 |
| 2002/0100371 A1 * | 8/2002 | Snoke | A47J 37/01 99/419 |
| 2002/0195001 A1 * | 12/2002 | Hester | A47J 37/049 99/345 |
| 2003/0056656 A1 * | 3/2003 | Marco, Jr. | A47J 37/106 99/345 |
| 2004/0187699 A1 * | 9/2004 | Citrynell | A47J 43/18 99/345 |
| 2005/0172823 A1 * | 8/2005 | Riddle, III | A47J 43/18 99/345 |
| 2005/0257693 A1 * | 11/2005 | Tschetter | A47J 37/0694 99/419 |
| 2006/0057267 A1 * | 3/2006 | Dow | A47J 36/00 426/524 |
| 2006/0219101 A1 * | 10/2006 | McIlwee | A47J 43/18 99/419 |
| 2006/0266227 A1 * | 11/2006 | Britt | A47J 43/18 99/426 |
| 2006/0283335 A1 * | 12/2006 | Vasquez | A47J 37/1295 99/403 |
| 2007/0181006 A1 * | 8/2007 | Measom | A47J 37/01 99/345 |
| 2009/0087535 A1 * | 4/2009 | Smith | A47J 43/18 426/523 |
| 2010/0018413 A1 * | 1/2010 | Thomas | A47J 37/043 99/421 HV |
| 2011/0209627 A1 * | 9/2011 | Wong | A47J 43/18 99/419 |
| 2011/0226135 A1 * | 9/2011 | Oswald | A47J 27/04 99/419 |
| 2012/0174799 A1 * | 7/2012 | Borovicka | A47J 37/0694 99/347 |

(56) References Cited

U.S. PATENT DOCUMENTS

2013/0112087 A1* 5/2013 Hassell ................ A47J 37/108
   99/421 H
2013/0216691 A1* 8/2013 Sudmalis ................ A47J 43/18
   426/644

* cited by examiner

INFUSION COOKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cooking assemblies.

(2) Description of Related Art Including Information Disclosed Under 37 CFR 1.97 and 1.98

The prior art relates to cooking assemblies and more particularly pertains to a new cooking assembly for infusing flavor into items during cooking.

BRIEF SUMMARY OF THE INVENTION

An embodiment of the disclosure meets the needs presented above by generally comprising a housing that has a top, which is open. A set of holes is positioned through a bottom of the housing. A set of cups is positionable in an internal space of the housing. Each of set of rods is coupled to and extends bidirectionally from a lower surface of a respective cup. The rods are complementary to the holes. A lid is reversibly couplable to the housing to cover the top. A tube is coupled to the lid and is fluidically coupled to interior spaces of the cups. The tube is configured for placement of an item to be cooked and flavored, such as a chicken. The cups are configured to insert flavoring items into the interior spaces. The flavoring items are heated and infused into the item to be cooked as the item is cooked.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
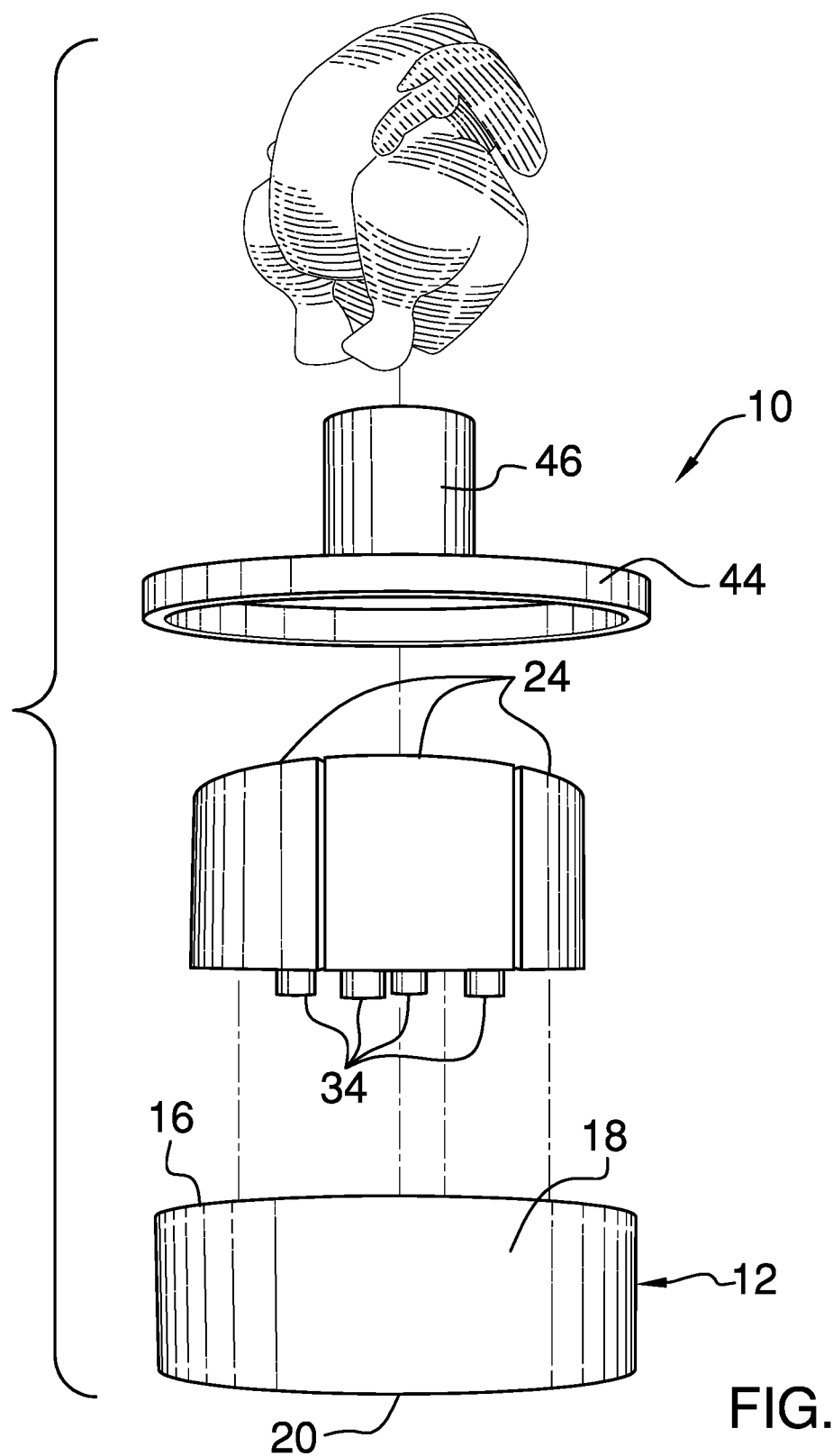
FIG. 1 is an exploded view of an infusion cooking assembly according to an embodiment of the disclosure.
Figure 2:
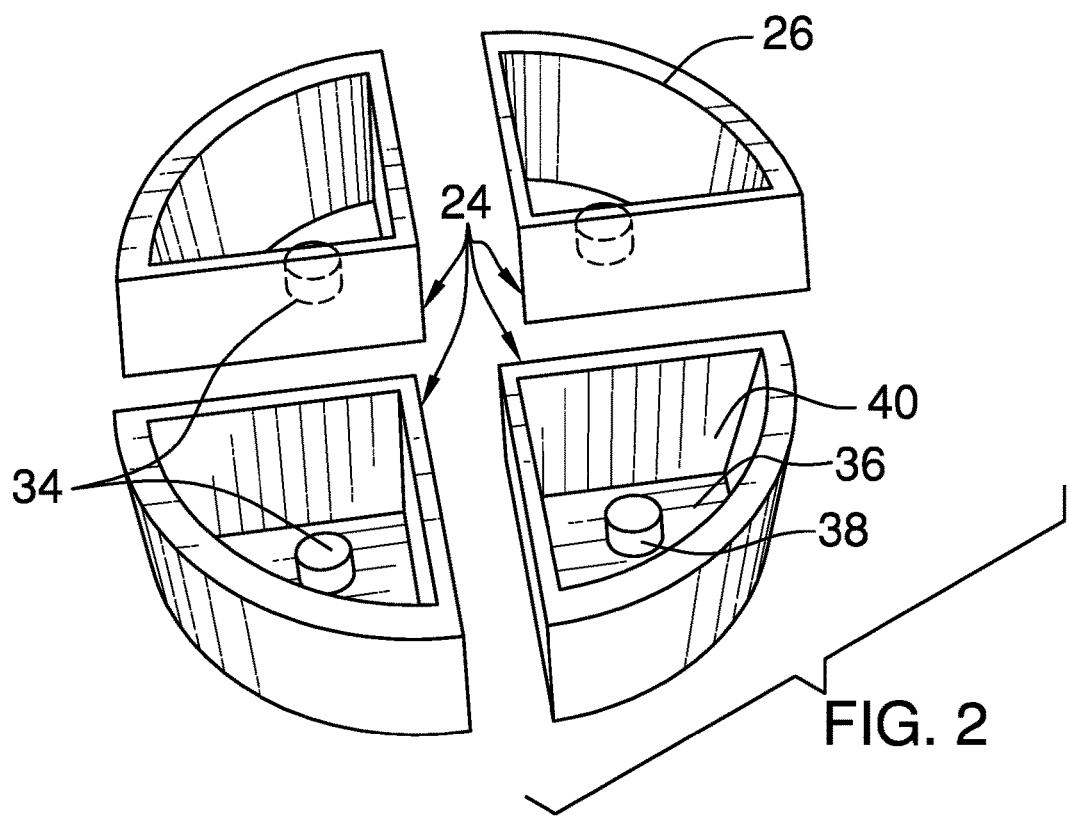
FIG. 2 is a top view of an embodiment of the disclosure.
Figure 3:
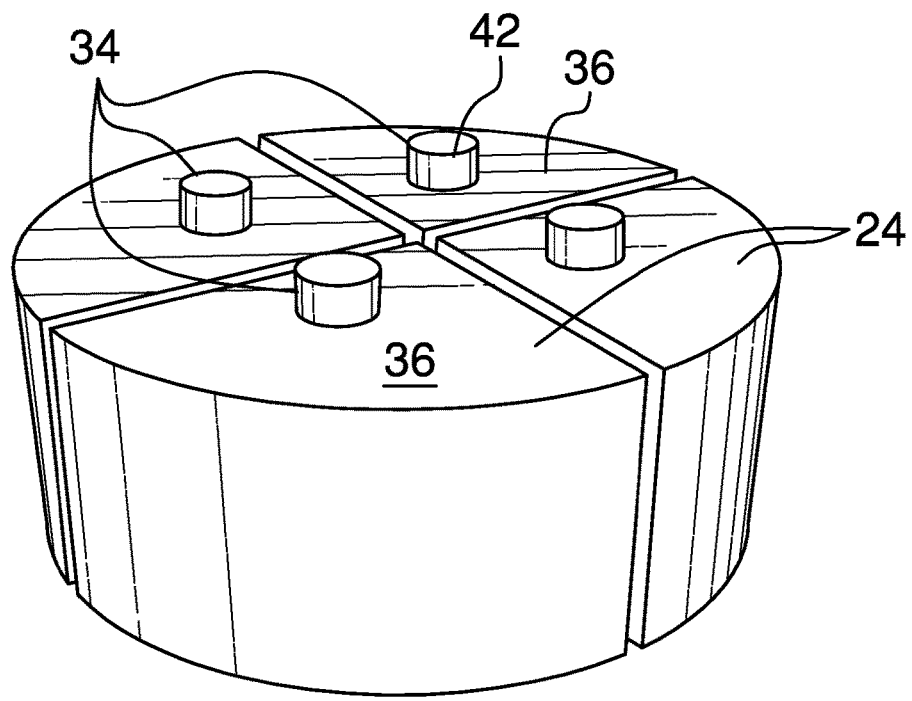
FIG. 3 is a bottom view of an embodiment of the disclosure.
Figure 4:
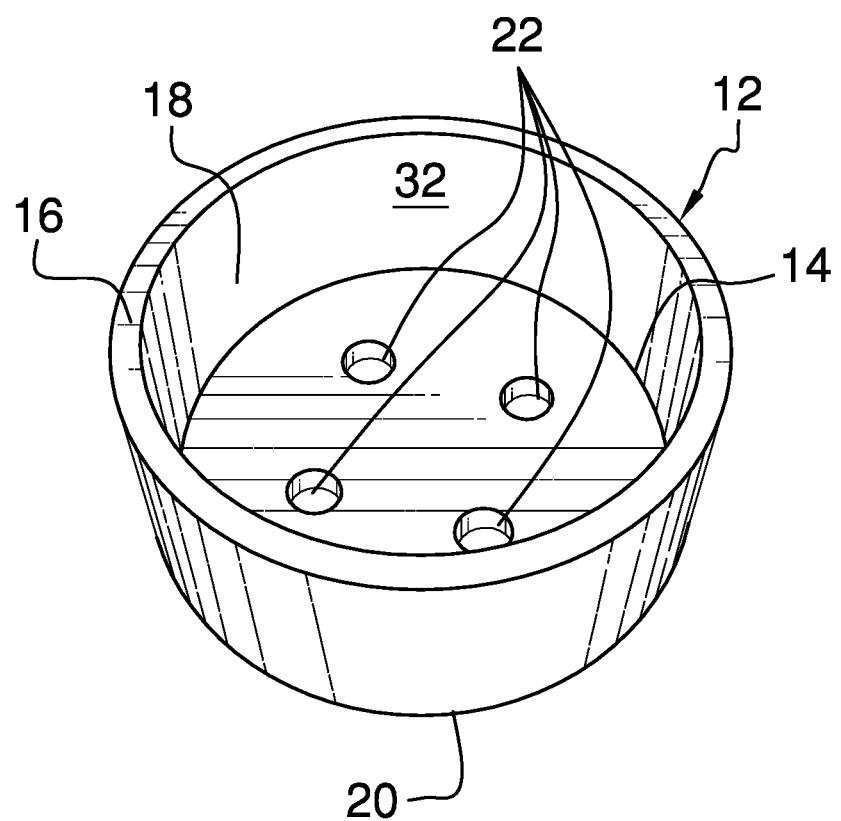
FIG. 4 is a top view of an embodiment of the disclosure.
Figure 5:
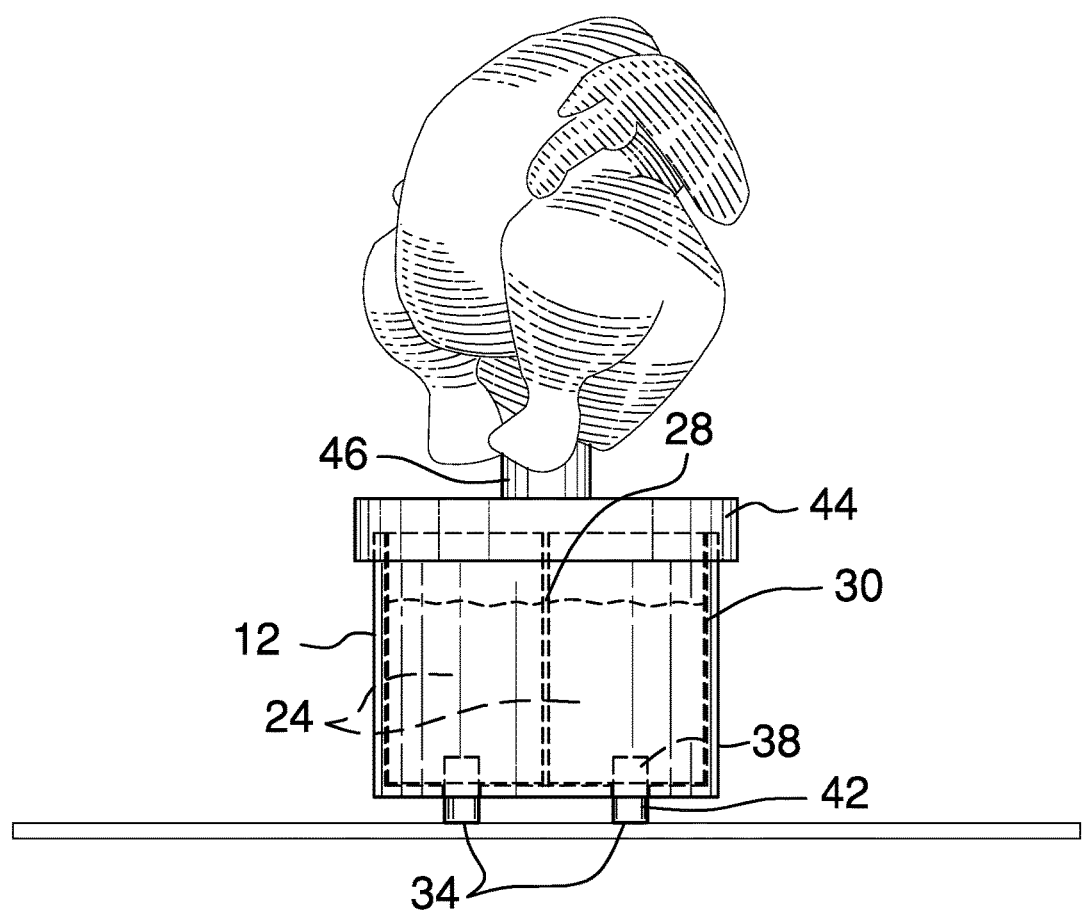
FIG. 5 is an in-use view of an embodiment of the disclosure.

With reference now to the drawings, and in particular to FIGS. 1 through 5 thereof, a new cooking assembly embodying the principles and concepts of an embodiment of the disclosure and generally designated by the reference numeral 10 will be described.

As best illustrated in FIGS. 1 through 5, the infusion cooking assembly 10 generally comprises a housing 12 that defines an internal space 14. The housing 12 has a top 16 that is open. The housing 12 comprises an annular wall 18 that extends from the top 16 to a bottom 20. In one embodiment, the housing 12 is substantially circularly shaped when viewed from the top 16. The housing 12 comprises heat-resistant material. In another embodiment, the housing 12 comprises ceramic. A set of holes 22 is positioned through the bottom 20 of the housing 12.

Each of a set of cups 24 defines an interior space 40. Each cup 24 has an upper surface 26 that is open. The set of cups 24 is substantially complementary to the internal space 14. In one embodiment, the set of cups 24 comprises from one to six cups 24. In another embodiment, the set of cups 24 comprises from two to five cups 24. In yet another embodiment, the set of cups 24 comprises four cups 24.

The cups 24 are sized such that a spacing 28 is present between adjacent cups 24 when the set of cups 24 is positioned in the internal space 14. The cups 24 also are sized such that a gap 30 is present between the set of cups 24 and an interior surface 32 of the annular wall 18 when the set of cups 24 are positioned in the internal space 14. The cups 24 comprise heat-resistant material. In one embodiment, the cups 24 comprise ceramic.

Each of a set of rods 34 is complementary to the holes 22. Each rod 34 is coupled to and extends bidirectionally from a lower surface 36 of a respective cup 24. A first section 38 of each rod 34 is positioned in the interior space 40 of the respective cup 24. A second section 42 of each rod 34 extends through and protrudes from the bottom 20 of the housing 12 when the set of cups 24 is positioned in the internal space 14. The rods 34 are positioned on the cups 24 such that the rods 34 are configured to transfer heat from the heat source to flavoring items that are positioned in the cups 24. In one embodiment, the rods 34 are substantially circular when viewed longitudinally. The rods 34 comprise metal. In another embodiment, the rods 34 comprise stainless steel.

The assembly 10 comprises a lid 44 that is complementary to the top 16. The lid 44 is reversibly couplable to the housing 12 to cover the top 16. The lid 44 comprises heat-resistant material. In one embodiment, the lid 44 comprises ceramic.

A tube 46 is coupled to the lid 44. The tube 46 is fluidically coupled to the interior spaces 40 of the cups 24. In one embodiment, the tube 46 is circularly shaped when viewed longitudinally. The tube 46 comprises heat-resistant material. In another embodiment, the tube 46 comprises ceramic.

In use, the housing 12 is positioned to insert the set of cups 24. The cups 24 are configured to insert the flavoring items into the interior spaces 40. The lid 44 is positioned to couple to the housing 12 such that the tube 46 is configured to place an item to be cooked and flavored, such as a chicken. The housing 12 is configured to place proximate to a heat source. The rods 34 are positioned on the cups 24 such that the rods 34 are configured to transfer heat from the heat source to the flavoring items positioned in the cups 24. The flavoring items are heated and infused into the item to be cooked as the item is cooked.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An infusion cooking assembly comprising:
   a housing defining an internal space, said housing having a top, said top being open;
   a set of holes positioned through a bottom of said housing;
   a set of cups, each said cup defining an interior space, each said cup having an upper surface, said upper surface being open, said set of cups being substantially complementary to said internal space;
   a set of rods, said rods being complementary to said holes, each said rod being coupled to and extending bidirectionally from a lower surface of a respective said cup;
   a lid complementary to said top, said lid being reversibly couplable to said housing to cover said top;
   a tube coupled to said lid, said tube being fluidically coupled to said interior spaces of said cups; and
   wherein said housing is positioned for insertion of said set of cups, wherein said cups are configured for insertion of flavoring items into said interior spaces, wherein said lid is positioned for coupling to said housing such that said tube is configured for placement of an item to be cooked and flavored, such as a chicken, wherein said housing is configured for placement proximate to a heat source, such that the flavoring items are heated and infused into the item to be cooked as the item is cooked.

2. The assembly of claim 1, further including said housing comprising an annular wall extending from said top to said bottom.

3. The assembly of claim 1, further including said housing being substantially circularly shaped when viewed from said top.

4. The assembly of claim 1, further including said set of cups comprising from one to six said cups.

5. The assembly of claim 4, further including said set of cups comprising from two to five said cups.

6. The assembly of claim 5, further including said set of cups comprising four said cups.

7. The assembly of claim 1, further comprising:
   said cups being sized such that a spacing is present between adjacent said cups when said set of cups is positioned in said internal space; and
   said cups being sized such that a gap is present between said set of cups and an interior surface of said annular wall when said set of cups is positioned in said internal space.

8. The assembly of claim 1, further comprising:
   a first section of each said rod being positioned in said interior space of said respective said cup;
   a second section of each said rod extending through and protruding from said bottom of said housing when said set of cups is positioned in said internal space; and
   wherein said rods are positioned on said cups such that said rods are configured to transfer heat from the heat source to the flavoring items positioned in said cups.

9. The assembly of claim 1, further including said rods being substantially circular when viewed longitudinally.

10. The assembly of claim 1, further including said rods comprising metal.

11. The assembly of claim 10, further including said rods comprising stainless steel.

12. The assembly of claim 1, further including said tube being circularly shaped when viewed longitudinally.

13. The assembly of claim 1, further including said housing, said cups, said lid, and said tube comprising heat-resistant material.

14. The assembly of claim 13, further including said housing, said cups, said lid, and said tube comprising ceramic.

15. An infusion cooking assembly comprising:
   a housing defining an internal space, said housing having a top, said top being open, said housing comprising an annular wall extending from said top to a bottom, said housing being substantially circularly shaped when viewed from said top, said housing comprising heat-resistant material, said housing comprising ceramic;
   a set of holes positioned through said bottom of said housing;
   a set of cups, each said cup defining an interior space, each said cup having an upper surface, said upper surface being open, said set of cups being substantially complementary to said internal space, said set of cups comprising from one to six said cups, said set of cups comprising from two to five said cups, said set of cups comprising four said cups, said cups being sized such that a spacing is present between adjacent said cups when said set of cups is positioned in said internal space, said cups being sized such that a gap is present between said set of cups and an interior surface of said annular wall when said set of cups is positioned in said internal space, said cups comprising heat-resistant material, said cups comprising ceramic;

a set of rods, said rods being complementary to said holes, each said rod being coupled to and extending bidirectionally from a lower surface of a respective said cup, a first section of each said rod being positioned in said interior space of said respective said cup, a second section of each said rod extending through and protruding from said bottom of said housing when said set of cups is positioned in said internal space, wherein said rods are positioned on said cups such that said rods are configured to transfer heat from a heat source to the flavoring items positioned in said cups, said rods being substantially circular when viewed longitudinally, said rods comprising metal, said rods comprising stainless steel;

a lid complementary to said top, said lid being reversibly couplable to said housing to cover said top, said lid comprising heat-resistant material, said lid comprising ceramic;

a tube coupled to said lid, said tube being fluidically coupled to said interior spaces of said cups, said tube being circularly shaped when viewed longitudinally, said tube comprising heat-resistant material, said tube comprising ceramic; and wherein said housing is positioned for insertion of said set of cups, wherein said cups are configured for insertion of flavoring items into said interior spaces, wherein said lid is positioned for coupling to said housing such that said tube is configured for placement of an item to be cooked and flavored, such as a chicken, wherein said housing is configured for placement proximate to the heat source, wherein said rods are positioned on said cups such that said rods are configured to transfer heat from the heat source to the flavoring items positioned in said cups such that the flavoring items are heated and infused into the item to be cooked as the item is cooked.

* * * * *